United States Patent [19]

Kohl et al.

[11] 4,125,393
[45] Nov. 14, 1978

[54] ULV PESTICIDE CONTAINING FERTILIZER

[75] Inventors: Wilhelm Kohl, Nievenheim; Robert Eibner, Hilden; Hans-Heinrich Nolle, Erkrath; Alfred Schneider, Meerbusch; Nikolaus-Johann Moldovany, Hilden, all of Germany

[73] Assignee: U.S. Philips Corporation, New York, N.Y.

[21] Appl. No.: 735,616

[22] Filed: Oct. 26, 1976

Related U.S. Application Data

[63] Continuation of Ser. No. 575,604, May 8, 1975, abandoned.

[30] Foreign Application Priority Data

May 8, 1974 [DE] Fed. Rep. of Germany ....... 2422173

[51] Int. Cl.[2] ................ C05G 3/02
[52] U.S. Cl. ................ 71/3; 71/27; 71/64 C; 71/DIG. 1; 71/DIG. 2; 252/356; 260/501.11; 260/501.2
[58] Field of Search ................ 71/1, 27–30, 71/DIG. 2, 112, 121, 55–57, 3, 49, DIG. 1, 64 C; 252/356; 260/501.11, 501.2, 501.17; 47/DIG. 4

[56] References Cited

U.S. PATENT DOCUMENTS

| | | | |
|---|---|---|---|
| 2,805,203 | 9/1957 | Knapp | 260/501.11 |
| 2,859,104 | 11/1958 | Kroll | 71/1 |
| 2,929,700 | 3/1960 | Bennett | 71/1 |
| 2,950,183 | 8/1960 | Niklin | 71/1 |
| 3,022,153 | 2/1962 | Miller | 71/1 |
| 3,080,410 | 3/1963 | Le Blanc | 71/DIG. 2 |
| 3,404,068 | 10/1968 | Batistoni | 71/1 |
| 3,429,915 | 2/1969 | Bersworth | 71/112 |
| 3,534,075 | 10/1970 | Andress | 260/501.11 |
| 3,706,545 | 12/1972 | Gray | 71/27 |
| 3,753,675 | 8/1973 | Young | 71/DIG. 2 |

*Primary Examiner*—Charles N. Hart
*Assistant Examiner*—Ernest G. Therkorn
*Attorney, Agent, or Firm*—Frank R. Trifari; Norman N. Spain

[57] ABSTRACT

When at least an anionic or non-ionic emulsifier which is hydrophilic and highly electrolyte-resistant, and neutralization products of alkyl- and/or alkanol amines with ethylene diamine tetra acetic acid, diethyldiamine penta acetic acid, and/or N-hydroxyethylene diamine triacetic acid or derivatives thereof are added to a leaf fertilizer, a fertilizer is obtained which is miscible with the highly concentrated ULV-pesticides and can be applied in common with these. The water evaporation during the application can be further reduced by the addition of at least one substance of the group polyalcohols, glycose syrup, sorbite, dispersible synthetic materials and polyhydroxycarboxylic acids.

6 Claims, No Drawings

ULV PESTICIDE CONTAINING FERTILIZER

This is a continuation of application Ser. No. 575,604, filed May 8, 1975, now abandoned.

The invention relates to a leaf fertilizer which consists of an aqueous solution of at least one macro-nutrient and/or at least one micro-nutrient and/or at least one secondary plant nutrient.

The use of liquid fertilizers on the basis of aqueous mineral salt solutions for leaf fertilization has been known for years and has proved to give good satisfaction. Such fertilizers comprise as a macro-nutrient water-soluble substance which provide nitrogen, phosphorus and/or potassium, for example, urea, ammonium nitrate, potassium nitrate, phosphoric acid, potassium phosphate, potassium sulphate and caustic potash solution. Micro-nutrients, that is substances which are needed by the plant in traces only are, for example, boric acid and water-soluble heavy metal salts, in particular sulphates, but also chlorides and nitrates, preferably of cobalt, molybdenum, zinc, copper, manganese and iron. Secondary plant nutrients are to be understood to mean vitamins, plant hormones and growth substances, for example, nicotinic acid amide, p-aminobenzoic acid, 3-indolyl acetic acid and potassium sorbate. An example of the composition of the abovementioned three components is described in French patent Specification No. 1,466,284.

A liquid leaf fertilizer consisting of an aqueous solution of macro-nutrients and micro-nutrients, as well as surface-active substances and a sodium salt of the ethylene diamine tetra acetic acid, is known from the published Japanese patent application No. 22206/68. With this fertilizer the problem is solved of bringing calcium in a soluble form. For this purpose are added to the fertilizer in addition organic acids, for example, malonic acid, tartaric acid and succinic acid. For the practical application, the said leaf fertilizer is diluted with the 300 to 2000-fold quantity of water.

The object of the German Auslegeschrift No. 2,119,140 is an invert emulsion consisting of a mineral salt solution and organic solvents as a dispersion medium. Said invert emulsion can take up only comparatively smal concentrations of mineral salt due to its high organic non-plant physiologically active part of solvent.

It is the object of the invention to give a solution to a problem for the explanation of which serve the following embodiments.

The use of pesticides occurs mainly according to three methods:

The conventional method is the so-called high-volume method. In this HV-method approximately 400 to 800 liters of spraying liquid per hectare are provided on the plant surfaces by means of spraying apparatuses. The pesticides used for this purpose have the following formulation: a plant protecting agent is dissolved in a solvent and said solvents take up in addition emulsifiers so as to be able to form, prior to the application, with the overall quantity of water an emulsion which is stable for a longer time. Thus the principle of said HV-method is to dissolve a so-called miscible oil in water and to distribute the resulting emulsion on the cultures by means of spraying apparatuses. Due to the large quantity of water, the amount of working time and labour is very high with this method. A certain advantage of said method is that the amount of water cannot be used only as a carrier for the emulsion, but that leaf fertilizers are also soluble in the amount of water. For example, the abovementioned leaf fertilizer according to the published Japanese patent application No. 22206/68 may be used in the HV-method.

The HV-method is known and is successfully used. Since most of the emulsifiers used in the conventional miscible oils are not optimum for the formation of emulsions in combination with high quantities of mineral substances, the nowadays usual leaf fertilizers can be provided in the aqueous plant protecting emulsions only to a certain final concentration. Above a concentration of mineral substances of 1 to 2%, the emulsion disintegrates very rapidly. The stability of such emulsions furthermore depends on the chemical nature of the individual nutrients. For example, in particular the higher valent metal cations, such as iron, magnesium and calcium, are very noxious for emulsions.

Due to the high amount of working time and labour and due to the endeavour to perform in monocultures, for example, citrus plantations or cotton cultures, the plant protection measure by aircraft, the amounts of water were ever reduced in practice. Finally, amounts of water between 150 liters per hectare were used. This is the so-called LV=Low-Volume method. If in such a LV-spraying liquid the corresponding amounts of mineral substances are also to be provided, the amount of mineral substances, measured in the HV method, is to be tenfolded in, for example, 50 liters per hectare. This ten-fold quantity of mineral substance then corresponds with a ten-fold quantity of plant protection agent which, of course, imposes higher requirements on the stability of the resulting emulsion. Thus, with simultaneous fertilizer application, the emulsions in the LV-method are essentially less table than in the HV-method. In particular in the use of plant nutrients with higher valent inorganic cations, for example, trivalent iron, calcium or magnesium, the danger exists of disintegration of the emulsion. For this reason, an addition of nutrient solution in the LV-plant protection method constitutes an increased risk for the stability of the application liquids.

The further rationalisation resulted in the so-called ULV (Ultra-Low-Volume) method for the pesticidal application. Said ULV-method is characterized in that quantities between 0.5 and 5 liters of formulated substance per hectare were used. The ULV-method is a result of the improvement of the application method. Special nozzles must be chosen. The spray is distributed on the cultures from aeroplane or by helicopter. In addition there exist ground application apparatus. In practice application quantities of 3 to 8 liters per hectare are used. The plant protection agents to be used for this purpose distinguish in their formulation essentially from the miscible oils used so far. This difference consists in that the active substance in such a ULV pesticide should be present in an essentially higher amount since in the application the quantity of active substance per hectare should be comparable to the quantity of active substance per hectare in the HV- or LV-methods. The nowadays known active substances, however, are partly so active that the quantity used is still below the average ULV-quantity. For this reason the active substances are mixed with a small quantity of solvent. In addition, all solid pesticidal substances which are to be used in the ULV-method should of course be dissolved in solvents before they are ready for application. Hence a ULV-pesticide is the highly concentrated solution of a pesticidal substance in a high-boiling-point solvent with the lowest possible vapour pressure. Said lowest possible vapour pression is necessary since the drop size during the travel of the drops after leaving the nozzle down to the surface of the plant may not be essentially reduced. In the case of considerably reduced drop sizes the danger exists that the substance is not uniformly deposited on the surfaces of the plants and in particular the danger exists that relevant agent drifts away under the action of already low wind velocities. As essential is to be stated that such a ULV pesticide need no longer contain an emulsifier since its water-miscibility is no longer necessary.

The development of the ULV-method was aimed at specifically in the plant protection range, i.e. the leaf fertilization nowadays usual all over the world has not simultaneously been incorporated in said development. This is very difficult, since the ULV pesticide contains a high-boiling-point organic solvent and the concentrations of micro- and macro-nutrients necessary for the fertilization can no longer be incorporated normally in such solvents. On the other hand it is a pressing requirement to be able to simultaneously peform the leaf fertilization in the case of plant protection measures. The conventional leaf fertilizers can no longer be mixed as such with the newly developed ULV pesticides since they are built up on the basis of water solution.

It is therefore an object of the invention to provide an active fertilizer which also permits of being mixed with the highly concentrated ULV-pesticides.

According to the invention this problem is solved by a leaf fertilizer which consists of an aqueous solution of at least one macronutrient and/or at least one micronutrient and/or at least one secondary plant nutrient and which is characterized in that the solution contains at least an anionic or non-ionic emulsifier which is hydrophilic and is highly electrolyte-resistant, and nuetralisation products of alkyl- and/or alkanol amines with ethylene diaminetetraacetic acid, diethyldiaminepentaacetic acid and/or N-hydroxyethylenediaminetriacetic acid or derivatives thereof.

As emulsifiers may be used within the scope of the invention: ethylene oxide adducts of partial fatty acid esters of glycerine and sorbite, condensation products of fatty acids with orthophosphoric acid as well as several ethoxylated fatty alcohols. In principle are suitable all the hydrophilic emulsifiers which have good solution-producing properties and which are available, for example, under the trademark Emulan ® (Tupes E, OC, OG, OSN and OU) of BASF AG., Ludwigshafen, Emcol ® (types AC 61-17, HJP1, HJP2, H12A, PS 415M and PS 331) of Witco Chemical CmbH, Frankfurt am Main, and Tensiofix (types CG11 and CG21) of Tensia S.A. Liege (Belgium).

The neutralization products of alkanol- and alkyl amines with ethylene diaminetetraacetic acid and the other above-mentioned acids of this group are formed upon mixing the starting products at room temperature. The resulting neutralization water is taken up by the final mixture.

It is to be noted that for the neutralization of ethylene diaminetetraacetic acid have been used so far caustic soda solution, caustic potash solution and ammonia solution. With these known neutralization products only a chelation of the trace elements is achieved; however, they do not have an emulsion stabilising effect to the above-described extent.

As alkanol amines for the fertilizer according to the invention may be used, for example, mono-, di-, and triethanolamine as well as their derivatives and homologues, such as methyl diethanolamine, dimethyl ethanolamine, ethyl ethanolamine, diethyl ethanolamine, di-n-butyl ethanolamine, mono-, di-, tri-isopropanolamine and n-butyl-diethanolamine. Suitable alkylamines are in particular those having 3 to 11 carbon atoms in the molecule.

Although it is known to use condensates of alkanol- and alkyl amines with long-chain fatty acids, for example, oleic acids, as emulsifiers in liquid plant protection compositions (German Offenlegungsschrift No. 1792458, German patent Specification No. 1,172,470), the problem underlying the invention, however, cannot be solved with such condensates.

In the investigations which have led to the invention, the following conditions have to be taken into account:

Water as a base should be maintained as in the conventional leaf fertilizers, since taking up and transport of the nutrients from the aqueous solution is the best method of foliage plant nutrition known so far.

It was absolutely necessary to provide the macronutrients or trace elements, that is to say the heavy metals, which are absolutely necessary for a nutrition of the plants, in a chelated form. However, such chelates are insoluble in organic solvents and, conversely, can best be dissolved in water. Therefore the problem was to be solved to make said highly concentrated mineral salt solutions miscible with the above-described ULV-pesticides with the addition of fully chelated trace elements. This could be done only by adding emulsifiers to the aqueous part, so to the fertilizer. Said emulsifiers should be hydrophilic since they were to be accommodated in the aqueous solution of the mineral substances. A second property of the emulsifiers should be that they tolerate the high concentrations of mineral salt as such. In this manner the selection possibility for the emulsifiers was reduced to a very narrow range of hydrophilic products which could stand mineral salts.

When these conditions are fulfilled, the aqueous mineral salt solution in the mixture with ULV-pesticides represents the open unprotected phase. In such a system the danger exists that the water which is present in the open phase easily evaporates from said emulsion. Such an evaporation results in a reduction of the size of the emulsion drop and hence a danger of drifting away and a non-uniform deposition.

For this reason it is efficacious to further reduce the evaporation of the water by additives so as to make such an aqueous system suitable for use in ULV-methods. According to a further variation of the invention this can be achieved in that at least a substance of the group of polyalcohols, glucose syrup, sorbite, dispersible synthetic materials and polyhydroxycarboxyl acids are added to the mineral salt solution.

As polyalcohols are to be considered in particular glycol and glycerin. Glucose syrup is a mixture of single and multiple sugars and it is also used to prevent the crystal formation of saccharose in syrups. Sorbite is a hexavalent alcohol of the hexite group. As dispersible synthetic materials are preferably used styrol-butadiene-mixed polymerisate dispersions.

The emulsifiers are preferably used in concentrations of from 2 to 12% by weight. For the neutralization products of the above-mentioned acids are to be preferred mixtures of 5 to 20% by weight. The preferred quantity of evaporation-inhibiting additives is between 5 and 20% by weight. All these quantities relate to the ready mixture.

It has furthermore been found that polyhydroxycarboxylic acids, which are to be understood to include aliphatic carboxylic acids having several hydroxyl groups and/or several carboxyl groups, are operative with respect to the solution of the problem underlying the invention to such an extent that the neutralization products of alkyl- and alkanolamines with ethylene diaminetetraacetic acid and related acids may be omitted, if desired.

It is therefore an additional object of the invention to provide a leaf fertilizer of the kind mentioned in the preamble which is characterized in that it contains at least one anionic or non-ionic emulsifier which is hydrophilic and highly electrolyte resistant and polyhydroxy carboxylic acids. The polyhydroxycarboxylic acids are preferably present in such a fertilizer in quantities of 0.5 to 10% by weight. The content of emulsifier is advantageously 1.0 to 20% by weight.

A product formulated according to these principles has the following application properties:

The aqueous solution according to the invention of micro- and macro-nutrients, also with the addition of evaporation-inhibiting materials, can be provided with the usual ULV-application apparatuses, both from aircraft and by ground apparatuses. For this reason the agent according to the invention is essentially better than the conventional leaf fertilizers, considered only from the point of view of fertilization.

The mixtures of mineral substances according to the invention can be mixed with a large number of commercially available ULV-pesticides. The stability of the resulting emulsions differs from half an hour to 10 hours. It has been found that such emulsion systems can be used according to ULV-standards.

The aqueous mineral salt solutions according to the invention are suitable for producing with conventional miscible oils partly emulsions and solubilized mixtures, respectively. Of the conventional miscible oils is known that they cannot be used efficaciously at all in the ULV-method or can be used with considerable difficulties. The leaf fertilizer solution according to the invention mixed with said normal miscible oils can make such a miscible oil suitable for ULV-method, i.e. the drop properties and hence the quality of the deposition of the pesticide are essentially positively influenced by the addition of the fertilizer according to the invention to conventional miscible oils.

It has proved possible to mix purely unformulated plant protecting agents in the form of highly concentrated emulsions with the ULV leaf fertilizer according to the invention and to apply said mixture in the ULV-method. For these application mixtures it has been found that the activity of the quantity of pesticide is the same as appears from the activities thereof from a ULV-formulation.

In some cases a quantity of pesticide of less than 5 liters per hectare is sufficient in the case of very active substances for a plant protection measure. With such small quantities an ideal and complete covering of the surfaces of the plants cannot be achieved in all the cases. In such cases a uniform covering and hence a better control of the noxious animals can be achieved by the addition of the fertilizer solution according to the invention.

Whereas in known aqueous leaf fertilizers the danger exists that its quantity of water immediately after leaving the nozzle of the spraying device evaporates partly, it has proved that when using the leaf fertilizer according to the invention alone or mixed with pesticides, in particular mixed with ULV-pesticides, by using the isotope method and the atom absorption spectrophotometry, that after providing in accordance with the ULV-technique the fertilizer solution according to the invention reaches the surface of the leaves to the same extent as a ULV-pesticide. The spraying pictures occurring also correspond to those of ULV-pesticides. It is even possible, by using the agent according to the invention, to improve the quality of pesticides used in ULV-methods as regards the drop spectrum and the degree of covering of the surface of the leaves. An example hereof is described in detail hereinafter.

The leaf fertilizer according to the invention, however, does not show advantages only when used in the ULV-method but also in the other application methods explained above: in the HV-method the content of emulsifier of the fertilizer solution according to the invention can support the stability of the resulting oil-in-water emulsion. This holds in particular also for the LV-applications, since in this case the mutual influencing of the mineral salt concentration and the concentration of pesticide is even larger due to the reduced quantity of water.

The use of the fertilizer solution according to the invention is carried out preferably as a tank mixture, that is a mixture of fertilizer and pesticide is produced immediately prior to nebulization.

In addition it is possible to produce commercial solutions which consist of mixtures of the fertilizer according to the invention with plant protection agents or solutions thereof in organic solvents.

The invention will be described in greater detail with reference to the following specific examples:

EXAMPLE 1

The following prescription was composed by mixing:

| Type 1: | heavy metal sulphate mixture | 75.0 kg |
|---|---|---|
| | urea | 218.0 kg |
| | emulsifier Emcol AC 61-17 | 50.0 kg |
| | auxiliary substances | 236.0 kg |
| | water | 421.0 kg |
| | | 1000.0 kg |

Within the scope of the examples, auxiliary substances are to be understood to mean both the neutralization products of ethylene diamine tetra acetic acid (EDTA), diethyl diaminepentaacetic acid and N-hydroxyethylene-diaminetriacetic acid with alkanol- and alkyl amines, and also the substances of the group polyalcohols, glucose syrup, sorbite, dispersible synthetic materials and polyhydroxycarboxylic acids which intensify the evaporation-inhibiting effect.

In the present example was used as an auxiliary substance a neutralization product which was prepared in that so much triethanolamine was added to EDTA until a pH value of 6–7 was reached.

EXAMPLE 2

The following prescription was composed by mixing:

| Type 1: | heavy metal sulphate mixture | 38.0 kg |
|---|---|---|
| | potassium hydroxide 45% | 150.0 kg |
| | phosphoric acid 85% | 66.0 kg |
| | urea | 268.0 kg |
| | emulsifier Emcol | |

-continued

| | |
|---|---|
| AC 61–17 | 80.0 kg |
| auxiliary substances | 106.0 kg |
| water | 292.0 kg |
| | 1000.0 kg |

As an auxiliary material served the neutralization product according to Example 1.

EXAMPLE 3

The same quantity to weight of paraffin oil (DAB 7) was added to the mixture of Example 1.

EXAMPLE 4

The same quantity by weight of paraffin oil of a quantity as in Example 3 was added to the mixture of Example 2.

EXAMPLE 5

20 kg of glycol and 20 kg of glycerin were added to the mixture of Example 1 as auxiliary substances in addition to the neutralization product mentioned there, without the overall quantity of auxiliary substance exceeding 236.0 kg.

EXAMPLE 6

Glycol and glycerin were added to the mixture as described in Example 2, analogously to Example 5.

EXAMPLE 7

The same quantity by weight of paraffine oil of a quality as in Example 3 was added to the mixture of Example 5.

EXAMPLE 8

The same quantity by weight of paraffin oil of a quality as in Example 3 was added to the mixture of Example 6.

EXAMPLE 9

Analogous to Example 5, 40 kg of glucose syrup was added to the mixture of Example 1 instead of glycol and glycerin. It was a product of Deutsche Maizena Werke GmbH, Hamburg, with a content in percent of reduced sugar of approximately 40. The sugars are composed of:

| | |
|---|---|
| D-glucose | approximately 18% |
| disaccharide (maltose) | approximately 14% |
| multiple and higher molecular saccharide | approximately 68% |
| further characteristics: | |
| specific weight (20° C) | 1.4–1.5 |
| index of refraction (20° C) | 1.4915–1.5049 |
| pH | 4.8–5.2 |

EXAMPLE 10

Glucose syrup was added to the mixture of Example 2, analogously to Example 9.

EXAMPLE 11

The same quantity by weight of paraffin oil of a quality as in Example 3 was added to the mixture of Example 9.

EXAMPLE 12

The same quantity by weight of paraffin oil of a quality as in example 3 was added to the mixture of Example 10.

EXAMPLE 13

Instead of glycol and glycerin was added to the mixture of Example 1, analogously to Example 5, 40 kg of sorbite in the form of the commercial product Karion-Griessform of Merck AG, Darmstadt. The use of the product Karion F liquid and Karion 83 yielded the same results.

EXAMPLE 14

Sorbite was added to the mixture of Example 2, analogously to Example 13.

EXAMPLE 15

The same quantity by weight of paraffin oil of a quality as in Example 3 was added to the mixture of Example 13.

EXAMPLE 16

The same quantity by weight of paraffin oil of a quality as in Example 3 was added to the mixture of Example 14.

EXAMPLE 17

Instead of glycol and glycerin were added to the mixture of Example 1, analogously to Example 5, 40 kg of a styrol-butadiene-mixed polymerisate dispersion as is commercially available from Chemische Werke Hüls AG as Litex ® 6301.

Such a dispersion shows the following indices:

| | |
|---|---|
| Content of solid | 46% |
| specific weight (dispersion) | 1.01 |
| pH value | 8.5 |
| content of monomers max. | 0.03% |
| particle diameter | 0.2 μ |
| surface tension | 33 dyn/cm |
| stabilization | non iogenic |
| frost stability | yes |
| viscosity | 15–20 cp |
| lowest temperature for the film formation | + 3° C |

EXAMPLE 18

A styrol-butadiene-mixed polymerisate dispersion was added to the mixture of Example 2, analogously to Example 17.

EXAMPLE 19

The same quantity by weight of paraffin oil of a quality as in Example 3 was added to the mixture of Example 17.

EXAMPLE 20

The same quantity by weight of paraffin oil of a quality as in Example 3 was added to the mixture of Example 18.

EXAMPLE 21

Instead of all the other auxiliary substances, 100 kg of polyhydroxycarboxylic acids in the form of the commercial product Borrechel of AS Borregaard, Sarpsborg, (Norway) were added to the mixture of Example 1, analogously to Example 5. This product had the following characteristics:

| | |
|---|---|
| pH, 3% solution | 8.7 |
| total sulphur, %S | 6.7 |
| sulphate ($SO_4^-$)%S | 2.0 |
| sulphite ($SO_3^{--}$)%S | 0.3 |
| sulphonate ($SO_3^{--}$)%S | 4.4 |
| degree of sulphonization | 0.65 |
| reducing sugar as pentosen | 0.9 |
| methoxyl, %$OCH_3$ | 6.3 |
| CL% | <0.005 |
| Na% | 9.5 |
| Ca% | 0.24 |
| Mg% | 0.05 |
| Fe% | 0.03 |
| Colour | yellowish brown |
| humidity% | 4.0 |
| water insolubles | <0.2 |
| weight by volume kg/l | 0.55 |

EXAMPLE 22

Polyhydroxycarboxylic acids were added to the mixture of Example 2, analogously to Example 21.

EXAMPLE 23

The same quantity by weight of paraffin oil of a quantity as in Example 3 was added to the mixture of Example 21.

EXAMPLE 24

The same quantity by weight of paraffin oil of a quality as in Example 3 was added to the mixture of Example 22.

The evaporation rate of the water from the solutions thus prepared in accordance with time was determined in that in reproducible conditions (20° C., normal air pressure, relative air humidity 65%) the same quantities of liquid were caused to evaporate in open Petri dishes and then weighed again. The measured results calculated in percent in the following Tables I to VI relate to the original quantity of water present in the mixture.

For comparison are stated in the Tables I to VI the evaporation rates of water and of pure mineral salt solutions, so solutions with emulsifiers but without auxiliary substances. The pure mineral salt solution according to Example 1 is denoted in the Table by A, the pure mineral salt solution in accordance with Example 2 is denoted by B.

In the last two lines of the Tables are each time stated results of mixtures with paraffin oil. These mixtures best approach the relations in practice. The Tables show individually:

Table I Values of mineral salt solutions with triethanolamine-EDTA
Table II Values of mineral salt solutions with triethanolamine -EDTA, glycol and glycerin,
Table III Values of mineral salt solutions with triethanolamine-EDTA and glucose syrup
Table IV Values of mineral solutions with triethanolamine-EDTA and sorbite
Table V Values of mineral salt solutions with triethanolamine-EDTA and a styrol-butadiene mixed polymerisate dispersion and
Table VI Values of mineral salt solutions with polyhydroxycarboxylic acids

TABLE I

| Mixture | | Water content % | Water evaporation (%) after | | | | | |
|---|---|---|---|---|---|---|---|---|
| | | | 5 min | 10 min | 15 min | 20 min | 25 min | 30 min |
| Water | | 100 | 15 | 30 | 45 | 60 | 70 | 91 |
| A | | 28 | 12 | 21 | 39 | 55 | 68 | 80 |
| B | | 38 | 12 | 20 | 40 | 51 | 65 | 78 |
| Example | 1 | 42 | 10 | 23 | 35 | 45 | 55 | 64 |
| " | 2 | 44 | 11 | 21 | 37 | 41 | 54 | 62 |
| " | 3 | 21 | 5 | 16 | 25 | 34 | 40 | 45 |
| " | 4 | 22 | 4 | 16 | 23 | 32 | 39 | 42 |

TABLE II

| Mixture | | Water content % | Water evaporation (%) after | | | | | |
|---|---|---|---|---|---|---|---|---|
| | | | 5 min | 10 min | 15 min | 20 min | 25 min | 30 min |
| Water | | 100 | 14 | 30 | 43 | 58 | 66 | 87 |
| A | | 28 | 12 | 18 | 36 | 52 | 65 | 75 |
| B | | 38 | 13 | 19 | 38 | 51 | 69 | 74 |
| Example | 5 | 42 | 10 | 16 | 19 | 35 | 45 | 51 |
| " | 6 | 44 | 11 | 15 | 20 | 30 | 43 | 49 |
| " | 7 | 21 | 5 | 13 | 17 | 21 | 31 | 37 |
| " | 8 | 22 | 6 | 12 | 14 | 20 | 30 | 35 |

TABLE III

| Mixture | | Water content % | Water evaporation (%) after | | | | | |
|---|---|---|---|---|---|---|---|---|
| | | | 5 min | 10 min | 15 min | 20 min | 25 min | 30 min |
| Water | | 100 | 13 | 31 | 42 | 57 | 65 | 89 |
| A | | 28 | 13 | 19 | 37 | 54 | 67 | 79 |
| B | | 38 | 15 | 20 | 39 | 52 | 70 | 79 |
| Example | 9 | 42 | 12 | 17 | 30 | 42 | 53 | 59 |
| - | 10 | 44 | 13 | 19 | 31 | 41 | 50 | 61 |
| - | 11 | 21 | 7 | 14 | 21 | 30 | 34 | 40 |
| - | 12 | 22 | 5 | 15 | 22 | 29 | 37 | 39 |

TABLE IV

| Mixture | | Water content % | Water evaporation (%) after | | | | | |
|---|---|---|---|---|---|---|---|---|
| | | | 5 min | 10 min | 15 min | 20 min | 25 min | 30 min |
| Water | | 100 | 13 | 27 | 43 | 57 | 66 | 88 |
| A | | 28 | 15 | 24 | 41 | 51 | 61 | 75 |
| B | | 38 | 13 | 19 | 37 | 51 | 65 | 78 |
| Example | 13 | 42 | 9 | 21 | 35 | 41 | 53 | 60 |
| " | 14 | 44 | 10 | 20 | 36 | 39 | 50 | 60 |
| " | 15 | 21 | 4 | 15 | 30 | 32 | 39 | 40 |
| " | 16 | 22 | 4 | 14 | 21 | 31 | 41 | 41 |

TABLE V

| Mixture | | Water content % | Water evaporation (%) after | | | | | |
|---|---|---|---|---|---|---|---|---|
| | | | 5 min | 10 min | 16 min | 20 min | 25 min | 30 min |
| Water | | 100 | 16 | 32 | 40 | 57 | 68 | 85 |
| A | | 28 | 13 | 25 | 39 | 48 | 70 | 72 |
| B | | 38 | 13 | 22 | 36 | 45 | 68 | 79 |
| Example | 17 | 42 | 8 | 17 | 30 | 38 | 49 | 52 |
| " | 18 | 44 | 7 | 16 | 32 | 36 | 47 | 50 |
| " | 19 | 21 | 3 | 10 | 28 | 30 | 31 | 34 |
| " | 20 | 22 | 2 | 9 | 17 | 30 | 30 | 31 |

TABLE VI

| mixture | | water content % | water evaporation (%) after | | | | | |
|---|---|---|---|---|---|---|---|---|
| | | | 5 min | 10 min | 15 min | 20 min | 25 min | 30 min |
| water | | 100 | 15 | 32 | 47 | 60 | 74 | 95 |
| A | | 28 | 10 | 18 | 39 | 51 | 65 | 80 |
| B | | 38 | 9 | 17 | 42 | 54 | 64 | 78 |
| Example | 21 | 42 | 5 | 12 | 15 | 25 | 30 | 35 |
| " | 22 | 44 | 4 | 10 | 14 | 27 | 29 | 37 |
| " | 23 | 21 | 3 | 8 | 10 | 19 | 22 | 25 |
| " | 24 | 22 | 2 | 7 | 9 | 17 | 20 | 23 |

By means of the following Example it is proved that it is possible to also incorporate magnesium and calcium in the leaf fertilizer according to the invention. The prescriptions in Examples 26 to 50 and the measured results in the Tables VII to XII were composed and stated in accordance with the above-described Examples and Tables.

EXAMPLE 25

Prescription type 3

| | |
|---|---|
| heavy metal sulphate mixture | 4.6 kg |
| magnesium chloride . 6H$_2$O | 25.2 kg |
| copper sulphate . H$_2$O | 4.0 kg |
| manganese sulphate . H$_2$O | 3.2 kg |
| urea | 300.4 kg |
| ammonium nitrate | 295.0 kg |
| Emcol AC 61 – 17 | 50.0 kg |
| auxiliary substances | 200.0 kg |
| water | 117.6 kg |
| | 1000.0 kg |

EXAMPLE 26

Prescription type 4

| | |
|---|---|
| heavy metal nitrate mixture | 4.6 kg |
| calcium chloride | 26.6 kg |
| copper nitrate | 4.0 kg |
| manganese nitrate | 3.2 kg |
| urea | 300.4 kg |
| ammonium nitrate | 295.0 kg |
| Emcol AC 61 –17 | 50.0 kg |
| auxiliary substances | 200.0 kg |
| water | 116.2 kg |
| | 1000.0 kg |

EXAMPLES 27 TO 30 FOR TABLE VII

C Example 25 mineral salt solution type 3
D Example 26 mineral salt solution type 4
E Example 27 C + triethanolamine + EDTA
F Example 28 D + triethanolamine + EDTA
G Example 29 50% paraffin oil/50% solution E
H Example 30 50% paraffin oil/50% solution F

EXAMPLES 31 TO 34 FOR TABLE VII

C Example 25 mineral salt solution type 3
D Example 26 mineral salt solution type 4
E Example 31 C + glycol + glycerin + EDTA – neutralization product
F Example 32 D + glycol + glycerin + EDTA – neutralization product
G Example 33 50% paraffin oil/50% solution E
H Example 34 50% paraffin oil/50% solution F

EXAMPLES 35 TO 38 FOR TABLE IX

C Example 25 mineral salt solution type 3
D Example 26 mineral salt solution type 4
E Example 35 C + glycose syrup + EDTA neutralization product
F Example 36 D + glycose syrup + EDTA neutralization product
G Example 37 50% paraffin oil/50% solution E
H Example 38 50% paraffin oil/50% solution F

EXAMPLES 39 TO 42 FOR TABLE X

C Example 25 mineral salt solution type 3
D Example 26 mineral salt solution type 4
E Example 39 C + sorbite + EDTA neutralization product
F Example 40 D + sorbite + EDTA neutralization product
G Example 41 50% paraffin oil/50% solution E
H Example 42 50% paraffin oil/50% solution F

EXAMPLES 43 TO 46 FOR TABLE XI

C Example 25 mineral salt solution type 3
D Example 26 mineral salt solution type 4
E Example 43 C + styrol butadiene mixed polymerisation dispersion + EDTA neutralization product
F Example 44 D + styrol butadiene mixed polymerisate dispersion + EDTA neutralization product
G Example 45 50% paraffin oil/50% solution E
H Example 46 50% paraffin oil/50% solution F

EXAMPLES 47 TO 50 FOR TABLE XII

C Example 25 mineral salt solution type 3
D Example 26 mineral salt solution type 4
E Example 47 C + polyhydroxycarboxylic acids
F Example 48 D + polyhydroxycarboxylic acids
G Example 49 50% paraffin oil/50% solution E
H Example 50 50% paraffin oil/50% solution F

EXAMPLE 51

Wenn Bladan Ultra Extra A consisting of 600 g of ethylparathion and 300 g of methylparathion per liter was used in the ULV-method in a quantity of 2.8 to 3.5 liter per hectare, neither a complete covering of the surfaces of the plants, nor a complete destruction of the noxious animals was achieved. Only by increasing the quantity to 5 to 5.7 liters per hectare by the addition of the fertilizer according to the invention as described in Example 1 could both an ideal drop distribution on the leaves and a complete annihilation of the noxious animals be achieved.

Table VIII

| Mixture | | Water content % | Water evaporation (%) after | | | | | |
|---|---|---|---|---|---|---|---|---|
| | | | 5 min | 10 min | 15 min | 20 min | 25 min | 30 min |
| Water | | 100 | 16 | 31 | 45 | 58 | 69 | 90 |
| C Example | 25 | 21.8 | 14 | 19 | 37 | 54 | 67 | 82 |
| D " | 26 | 21.6 | 12 | 18 | 39 | 52 | 62 | 79 |
| E " | 27 | 34.2 | 11 | 19 | 35 | 42 | 57 | 60 |
| F " | 28 | 36.2 | 11 | 17 | 32 | 40 | 50 | 62 |
| G " | 29 | 17.1 | 7 | 14 | 21 | 29 | 37 | 40 |
| H " | 30 | 18.1 | 5 | 16 | 23 | 30 | 36 | 37 |

Table VIII

| Mixture | | Water content % | Water evaporation (%) after | | | | | |
|---|---|---|---|---|---|---|---|---|
| | | | 5 min | 10 min | 15 min | 20 min | 25 min | 30 min |
| Water | | 100 | 15 | 27 | 32 | 42 | 62 | 75 |
| C Example | 25 | 21.8 | 12 | 16 | 36 | 52 | 60 | 70 |
| D " | 26 | 21.6 | 13 | 16 | 39 | 53 | 65 | 69 |
| E " | 31 | 34.2 | 9 | 17 | 19 | 30 | 42 | 49 |
| F " | 32 | 36.2 | 11 | 12 | 19 | 25 | 39 | 45 |
| G " | 33 | 17.1 | 3 | 12 | 15 | 20 | 24 | 32 |
| H " | 34 | 18.1 | 2 | 10 | 11 | 18 | 20 | 29 |

TABLE TX

| Mixture | | Water content % | Water evaporation (%) after | | | | | |
|---|---|---|---|---|---|---|---|---|
| | | | 5 min. | 10 min. | 15 min. | 20 min. | 25 min. | 30 min. |
| Water | | 100 | 10 | 29 | 40 | 52 | 63 | 79 |
| C Example | 25 | 21.8 | 12 | 17 | 35 | 51 | 62 | 68 |
| D " | 26 | 21.6 | 15 | 19 | 35 | 50 | 67 | 70 |
| E " | 35 | 34.2 | 10 | 16 | 31 | 40 | 50 | 51 |
| F " | 36 | 36.2 | 12 | 17 | 34 | 40 | 50 | 58 |
| G " | 37 | 17.1 | 7 | 10 | 21 | 30 | 32 | 38 |
| H " | 38 | 18.1 | 4 | 12 | 20 | 20 | 25 | 30 |

TABLE X

| Mixture | Water content % | Water evaporation (%) after | | | | | |
|---|---|---|---|---|---|---|---|
| | | 5 min. | 10 min. | 15 min. | 20 min. | 25 min. | 30 min. |
| Water | | 100 | 12 | 21 | 39 | 50 | 60 | 90 |
| C Example | 25 | 21.8 | 14 | 20 | 44 | 52 | 61 | 71 |
| D " | 26 | 21.6 | 13 | 14 | 30 | 50 | 60 | 70 |
| E " | 39 | 34.2 | 9 | 20 | 32 | 40 | 50 | 60 |
| F " | 40 | 36.2 | 9 | 18 | 30 | 35 | 47 | 55 |
| G " | 41 | 17.1 | 4 | 14 | 27 | 32 | 35 | 39 |
| H " | 42 | 18.1 | 4 | 14 | 26 | 31 | 32 | 32 |

TABLE XI

| Mixture | Water content % | Water evaporation (%) after | | | | | |
|---|---|---|---|---|---|---|---|
| | | 5 min | 10 min | 15 min | 20 min | 25 min | 30 min |
| Water | | 100 | 14 | 30 | 35 | 50 | 62 | 80 |
| C Example | 25 | 21.8 | 10 | 21 | 35 | 42 | 70 | 70 |
| D " | 26 | 21.6 | 12 | 20 | 30 | 41 | 67 | 75 |
| E " | 43 | 34.2 | 7 | 15 | 30 | 32 | 41 | 50 |
| F " | 44 | 36.2 | 6 | 16 | 30 | 35 | 46 | 49 |
| G " | 45 | 17.1 | 3 | 10 | 21 | 30 | 32 | 35 |
| H " | 46 | 18.1 | 1 | 9 | 10 | 20 | 30 | 30 |

TABLE XII

| Mixture | Water content % | Water evaporation (%) after | | | | | |
|---|---|---|---|---|---|---|---|
| | | 5 min | 10 min | 15 min | 20 25 min min | | 30 min |
| Water | | 100 | | 30 | 45 | 61 | 75 | 90 |
| C Example | 25 | 21.8 | 8 | 16 | 31 | 50 | 65 | 70 |
| D " | 26 | 21.6 | 8 | 12 | 40 | 50 | 61 | 78 |
| E " | 47 | 34.2 | 5 | 10 | 14 | 21 | 27 | 36 |
| F " | 48 | 36.2 | 3 | 9 | 10 | 22 | 26 | 30 |
| G " | 49 | 17.1 | 3 | 6 | 11 | 17 | 21 | 25 |
| H " | 50 | 18.1 | 2 | 6 | 9 | 12 | 19 | 23 |

What is claimed is:

1. A leaf fertilizer consisting essentially of an aqueous solution containing nutritively effective amounts of at least one plant nutrient, an effective amount of a ULV pesticide composition 2-12% by weight of at least one hydrophilic and highly electrolyte-resistant anionic or non-ionic emulsifier and 5-20% by weight of at least one neutralization product of at least one amine selected from the group consisting of alkylamines and alkanolamines with at least one amino acid selected from the group consisting of ethylene diamine tetraacetic acid, diethyldiamine pentaacetic acid and N-hydroxylethylenediamine triacetic acid.

2. The leaf fertilizer of claim 1 wherein from 5 to 20% by weight of the water evaporation reducing material is present.

3. The leaf fertilizer of claim 1 wherein in addition a plant protective substance is present.

4. The leaf fertilizer of claim 1 containing in addition a water evaporation reducing material, said material being selected from the group consisting of glycol, glycerin, glucose sobritite, butadiene-stryrene copolymer dispersions and polyhydroxy aliphatic carboxylic acid.

5. The leaf fertilizer of claim 4 wherein a polyhydroxy aliphatic carboxylic acid is present.

6. The leaf fertilizer of claim 5 wherein 1 to 20% by weight of the emulsifier is present and 5 to 20% by weight of the polyhydroxy aliphatic carboxylic acid is present.

* * * * *